Jan. 30, 1945.    R. S. WILE    2,368,508
PROCESS OF TREATING ORES AND ELECTRIC FURNACE THEREFOR
Filed Aug. 3, 1940    2 Sheets-Sheet 1

Fig.1.

INVENTOR
RAYMOND S. WILE
BY

ATTORNEY

Patented Jan. 30, 1945

2,368,508

UNITED STATES PATENT OFFICE 2,368,508

PROCESS OF TREATING ORES AND
ELECTRIC FURNACE THEREFOR

Raymond S. Wile, Flushing, N. Y., assignor to
Wile Service, Inc., Flushing, N. Y., a corporation Application August 3, 1940, Serial No. 350,833

17 Claims. (Cl. 75—11)

The present invention relates to a process of treating and reducing iron ores, iron ores containing valuable constituents, including nickel, chromium, manganese, titanium, molybdenum and/or various other ferro-alloy ores, and combination of ores, and more particularly to a process of directly reducing ores of the described character to a commercially acceptable low carbon metallic product in a single operation or without remelting.

Heretofore, the customary process of treating ores of the described character involved smelting the ores with an excess of carbon in order to accomplish complete reduction of the ferrous ores or ferrous alloy ores. Frequently, the excess carbon was required for fuel or for decreasing the electrical resistance of the charge in case an electric furnace was employed. Generally speaking, the result was a high carbon iron or a high silicon iron, or both, if iron ore was smelted, or a high carbon ferro-alloy, when ferro-alloy ores were smelted. In many cases the resultant products contained as much as 6% to 7% carbon and were not as readily saleable as products having a lower carbon content. It was also frequently customary when a low carbon product was desired to remelt this high carbon alloy and to add ferro silicon thereto to remove the carbon, possibly in the form of silicon carbide. Similar results could be obtained by the addition of other decarburizing agents. Of course, this procedure not only required various additional operations, cumbersome equipment, additional labor and other cost, but was also expensive for the reason that ferro silicon or other decarburizers are not low priced commodities.

As those skilled in the art know, iron ores containing substantial amounts of nickel and chromium are found in large quantity at various places. Thus, such ores are produced in huge quantities as waste products from asbestos mining. Obviously, it is highly desirable to smelt such ores without losing the nickel and chromium and other valuable constituents but prior processes were incapable of accomplishing this result on a practical and industrial scale. In most cases some of the nickel and most of the chromium and other valuable constituents were almost completely lost during the reduction or smelting process and a pig-iron was obtained which had only a greatly restricted market. A further disadvantage of conventional processes was their inability to treat finely divided ores on a large scale. As is shown, if a finely divided iron ore, such as a hematite ore containing nickel and chromium, was smelted in a blast furnace, due to the fineness of the charge, most of the product would be blown out and practically all of the chromium would be oxidized and would slag off. The product was an ordinary cast iron carrying some nickel and very little chromium. Generally speaking, there was little or no market for a product of this kind. On the other hand, if it would be possible to directly produce steel with a preferred and specific carbon content from such ores, there would not only be a substantial market for such product but at the same time the cost of production would be greatly reduced. Moreover, as the nickel and chromium would not be lost, the product would have considerably more value than the product obtained from conventional processes. Although this situation was well known to those skilled in the art, and from time to time various suggestions and proposals were made to solve the outstanding problem and to provide a simple and practical process for treating iron ores of the described character, none, as far as I am aware, of these prior suggestions and proposals was satisfactory and successful on a practical and industrial scale.

I have discovered a simple and completely satisfactory solution of the outstanding problem.

It is an object of the present invention to provide a process for treating iron ores of the described character which is free from the disadvantages and inconveniences of conventional processes.

It is another object of the present invention to provide a novel and improved process of treating iron ores, particularly iron ores containing nickel, chromium and other valuable constituents, which is capable of directly reducing such ores to a ferrous product of preferred carbon content with only a low loss of the valuable constituents, including nickel, chromium, etc.

It is a further object of the invention to provide a process for directly treating finely divided iron ores, particularly iron ores containing valuable constituents, in the electric furnace which eliminates the great losses of charged material inherent to conventional smelting and reducing processes.

Still another object of the invention is to provide a process for treating finely comminuted iron ores in an electric furnace of the slag resistance type capable of directly producing a ferrous product having a predetermined, preferred and readily controllable carbon content.

It is a further object of the invention to provide a process for producing steel of predetermined and controllable carbon content, directly from ore, particularly finely divided ore.

The invention also contemplates to provide a novel process of treating iron ores, particularly finely comminuted iron ores, involving the preliminary treatment of the ore in an auxiliary vessel and a main treatment of such pretreated ore in an electric slag resistance furnace whereby a heretofore unobtainable economy of operation is obtained.

The invention further contemplates a process for continuously producing steel and low carbon iron directly from ore.

It is also within the contemplation of the invention to provide a novel apparatus for treating ferrous ores, including ferrous ores containing nickel, chromium and other valuable constituents, which is simple in construction, and which is relatively inexpensive to build and to operate on a practical and industrial scale.

Other and further objects of the invention will become apparent to those skilled in the art from the following description taken in conjunction with the accompanying drawings illustrating a preferred embodiment of an apparatus for carrying out the process of the invention, in which.

Broadly stated, in accordance with the principles of my invention I provide a preliminary treatment of the ores in an auxiliary vessel which may be a rotary kiln, a furnace, a drying or mixing hearth, a flash roaster, and the like. A reducing atmosphere is maintained in this vessel and various addition agents such as reducing agents, fluxing agents, etc. may be added to the charge, if necessary. The comminuted or pulverulent mixture of charge and addition agents is heated in the auxiliary vessel to effect partial reduction, eliminate gaseous products, preheat the charge, partially remove phosphorus and sulphur, etc. After the preliminary treatment in the auxiliary vessel has been completed, I transfer or conduct the preheated charge into an electric furnace, preferably to an electric furnace of the slag resistance type. Further additions of alloying elements, fluxes, etc., may be made in the electric furnace in order to control the treatment of the ores in the furnace and the composition of the product. In addition, these addition agents also determine the character of the slag layer and thereby the electrical conditions and the thermal conditions within the furnace. Excess slag and finished metallic product may be continuously or intermittently tapped from the electric furnace. Gases produced during the pretreating process and in the main treating process may be recirculated in various ways in order to maintain preferred conditions and temperatures.

Generally speaking, before starting the treatment, it is of great importance to make an analysis of the ore and of the limestone or other fluxing agents, and also of the coke or coal or other reducing agents to ascertain the oxygen content, carbon content, etc. Hereafter, the amount of carbon required for reducing the oxides in the ore is calculated and the addition of carbon is carefully controlled to avoid the addition to the charge of any substantial excess carbon. Only such moderate amount of excess carbon may be added to the charge as is desired to be retained in the finished product but this moderate amount may be added later in the process. Sufficient amount of limestone and/or other fluxing material is added to this charge, if necessary, and the charge is introduced, preferably continuously, into an auxiliary vessel where the loose particles of the charge are agitated while being subjected to heat. The charge containing the reducing agent and fluxing material is preferably premixed with the ore before being subjected to pretreatment, although it will be apparent that the fluxing material might be separately pretreated. This preliminary treatment of loose, agitated charge particles will not only break down any limestone to lime and remove gases from the charge thereby reducing gas formation in the smelting furnace but it will preheat the charge before it enters the electric furnace and will cause partial reduction of the ore by raising the temperature of the ore to a point where such reduction will take place. Also, the preliminary treatment will cause all the carbon to come into intimate contact with the oxide so that there will be no excess carbon to build up a high carbon content in the resulting metal. Moreover, the reduced gas formation provides a very quiet charge which is critically important when treating the finely comminuted ores principally contemplated by the present invention. As a result of this preliminary treatment in the auxiliary vessel, when the ore charge reaches the furnace, comparatively small amounts of heat are required to effect complete smelting and to cause separation of slag and metal. Of course, this greatly reduces the cost and makes it possible to carry out the process of the invention on an industrial scale and with excellent economy.

The charge pretreated in the auxiliary vessel is fed, continuously or intermittently, into a short shaft electric furnace having a comparatively deep slag bath. The elimination of gases and the absence of blast results in a quiet charge in the shaft resting on the slag bath. The shaft or stack may have doors or other means of access therein from which samples of the descending charge may be taken to control and to check or study the conditions in the shaft. If there is an excessive amount of carbon present in the material, raw oxides may be fed into the shaft or stack above the slag line, for example by means of a screw conveyor, to correct this condition. Likewise, if the amount of fluxes or of reducing agents is insufficient, this condition may be corrected. Thus, it will be appreciated that according to the process of the invention it is possible to carefully and critically adjust the composition of the charge to preferred operating conditions, and compositions. In case the addition of lime to the initial charge was insufficient to remove the remaining silica, phosphorus and sulfur to below the maximum tolerable values, this situation can be and should be corrected at this point by adding the necessary amount of lime and other purifying agents or slag formers. This is an important consideration in view of the fact that once the metal begins to sink through the slag to the bottom, only the amount of slag formers already present will have any effect and the metal must be tapped from the furnace in the resulting condition.

It is to be observed that it is of great importance to carefully exclude substantially all extraneous air both from the auxiliary vessel and from the furnace. One of the reasons for this is that metals such as chromium, titanium, vanadium, manganese, and the like are easily oxidized and lost in the slag. Exclusion of the external air is not connected with any great difficulty since the process of the invention does not employ any blast or air for combustion in the electric furnace and all air admitted with the charge is removed prior to the time the charge is introduced into the shaft of the electric furnace. I have found that the care and the thoroughness with which the composition of the ore is determined, and the amount of addition agents, for example carbon, is calculated, determines the quality of the product so that by carefully following the essential steps of the present invention a product closely conforming in its composition to the desired composition may be obtained. Having once obtained an analysis of the ore or otherwise determined the proper proportion of carbon to reduce substantially all the iron and other valuable constituents of the particular ore without leaving an undesired excess of carbon, it will be apparent that in carrying out the process such determination of the proper proportion of carbon in any suitable manner, empirical or otherwise, need only be repeated as often as required by variations in the composition of the ore, etc., or as required for check or control purposes.

As it has been pointed out in the foregoing, I prefer to use a slag resistance electric furnace, for example a suitably adapted slag resistance furnace of the type described in my U. S. Patent No. 2,087,272. This is in direct contrast to the prior practice followed in the conventional processes of producing most ferro alloys involving an electric furnace in which the heat is produced by passing an electric current through the charge itself which for this reason has to contain a substantial excess of carbon. This prior process is referred to in the art as the "smothered arc method" and produces a metal having a high carbon content. In contrast to this, it is the essence of the present invention to determine the oxygen value of the ore and to initially add to the charge lesser amount of reducing agents than is necessary to effect the complete reduction of the metal oxides in the ore.

Any gases from the smelting furnace, principally consisting of carbon monoxide, and the gases produced in the auxiliary vessel where the premixing of the ore may be accomplished, may be mixed with sufficient amounts of air to effect combustion and burned in the auxiliary vessel. If desired, other heating means may be used to supply any deficiency. Of course, it will be apparent that any other fuel, gaseous, liquid and/or solid, may be used instead of the gases produced by the process in the apparatus. Some of the gases leaving the smelting furnace and the auxiliary vessel may be in the form of carbon dioxide. If it is desired to increase the carbon monoxide content and thereby to increase the calorific content of these gases, any well-known coke bed process may be employed, as those skilled in the art will readily understand. Of course, it is not absolutely necessary to introduce carbon monoxide to preheat the charge since gas, oil, powdered coal, etc., may be used with equal or similar results but carbon monoxide is preferred due to the fact that it is obtained in the process and is available at no extra cost.

Since the absence of excess amounts of reducing agents usually leaves some unreduced iron oxide and/or other metal oxide when the charge reaches the smelting zone, proper flux additions must be made to compensate for this condition. This is accomplished by flux additions whereby the slag is maintained at the proper composition for obtaining optimum operating conditions in the furnace and the separation of unreduced oxide material from reduced metal. Although this procedure may cause the loss of some of the original material, such as the iron oxide or iron alloy oxide, this is a very small percentage of the total charge, and is compensated for by the distinct advantage of the present process that it is capable of making steel directly from the ore or of making low carbon alloys.

Once the ore charge, or partially reduced ore charge, reaches the molten slag, the carbon-free pellets of metal, or the pellets containing the desired amount of carbon, will sink beneath the slag and any non-metallic constituents, such as silica, iron compounds, or other ash constituents contained in the reducing agents, etc., are slagged off with the other waste material. This is in direct contrast to the process occurring in the high temperature zone of conventional smothered arc furnaces or in blast furnaces where such deleterious constituents become part of the resultant metal. Due to the fact that the process of the invention employs an amount of carbon which is insufficient for complete reduction of all of the oxides, these impurities do not have an opportunity to be reduced since they generally have a higher reduction point than the iron oxide, hence the carbon reducing agent will act on the iron oxide first.

Figure 1:
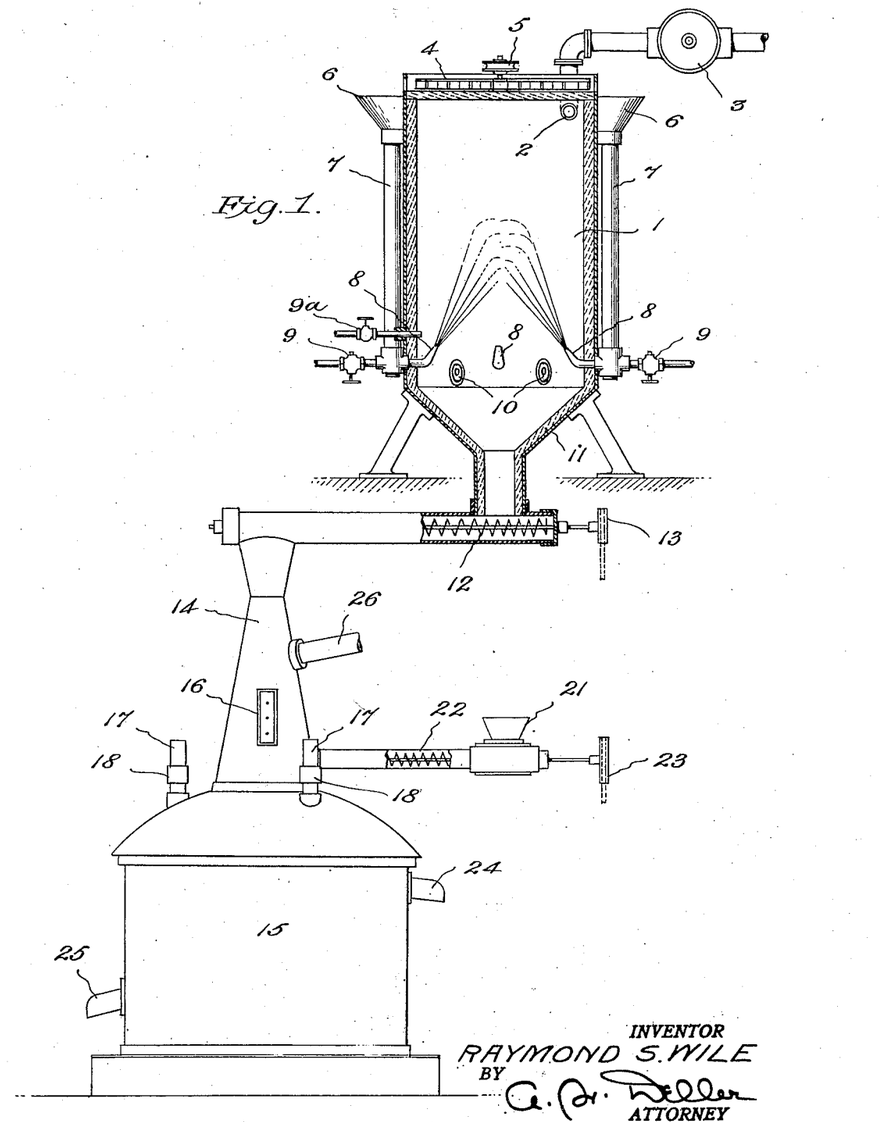
Fig. 1 is a diagrammatic elevation with parts in section.
Figure 2:
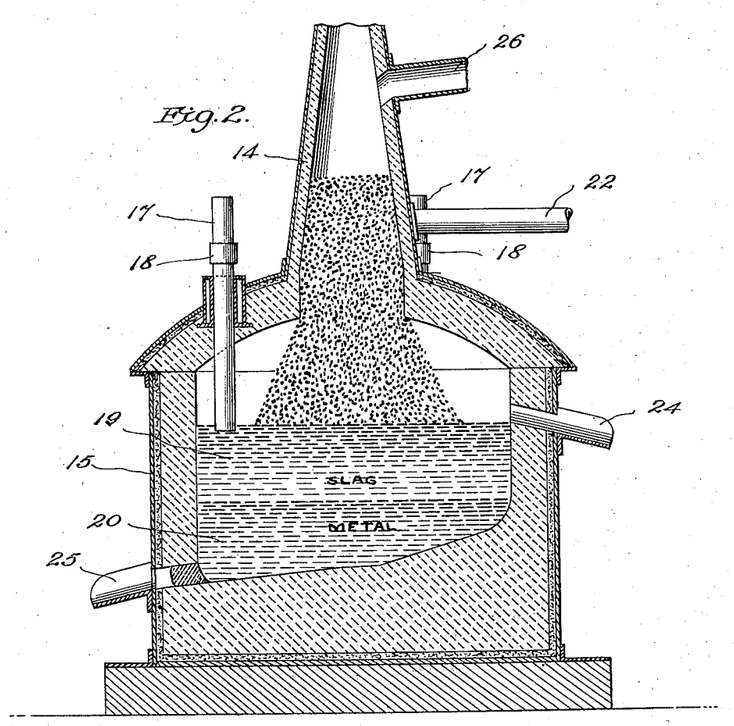
Fig. 2 is a vertical section through the electric furnace depicted in Fig. 1.
Figure 3:
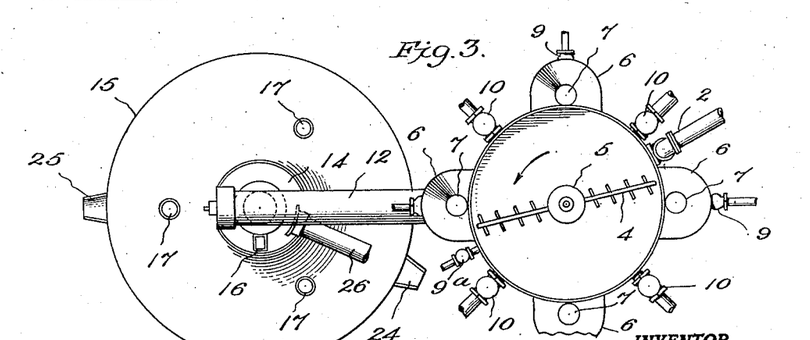
Fig. 3 is a top plan view of the apparatus.

A preferred embodiment of an apparatus for carrying the process of the invention into practice is shown in Fig. 1, Fig. 2 and Fig. 3 of the accompanying drawings. The apparatus comprises an auxiliary vessel 1 which may take various forms but in the present case is shown as a vertical cylindrical chamber constituted of refractories encased in a steel shell. The top portion of chamber 1 is provided with an outlet 2 connected to a variable speed fan 3 serving as means for removing waste gases from the apparatus. Rabbling mechanism or rabble arm 4 adapted to be rotated by means of a pulley 5 is provided atop the auxiliary vessel for drying the batch of ore and for stirring and pushing the mixed and dried batch of ore, etc., to funnels 6 which are operatively associated with tubes 7. These tubes are connected to injectors 8 of which a plurality may be arranged in the lower portion of chamber 1. Injectors 8 are connected through high pressure air valves 9 to a suitable source of air under pressure which causes the finely comminuted ore to be sucked in through tubes 7 and to be injected at a substantial velocity into chamber 1. Of course, any suitable type of blower and the like may be used for injecting the air, ore, etc., into the auxiliary vessel. If desired, secondary air for combustion may be supplied to the interior of the auxiliary vessel through any suitable means and such means are of advantage in the treatment of sulfide ores to reduce the sulfur content. Suitable means controlled by valve 9a have been illustrated in the drawings for such purposes. The secondary air may be introduced under atmospheric pressure by creating sub-atmospheric pressures within the chamber. In some cases it is advantageous to employ the gases produced in the process either alone or in combination with other gases as a circulating medium to retard some of the reactions. Heat is supplied to chamber 1 by means of burners 10 in which the gases, for example the gases produced in chamber 1, may be burned. Alternatively, other heating means may be employed. In the event that these gases are insufficient, other fuels including oil, powdered coal, etc., may be used. The lower portion of chamber 1 is provided with a funnel-like extension 11 which is connected to a screw conveyor 12 operated by suitable means 13 for displacing the pre-treated charge material into the shaft or stack 14 of electric furnace 15. Preferably, this furnace is of the slag resistance type referred to in the foregoing. I have found that it is advantageous to employ a short shaft of strongly upwardly tapering dimensions in order to keep low the weight of the charge which is to be supported by the slag bath and to counteract the tendency of finely comminuted charges to "bridge over." The shaft should not decrease in cross-section as the charge travels down the shaft, i. e., the walls should be non-converging downwardly. An upwardly tapering shaft has been illustrated in the drawings but parallel walls may be used, for example, the shaft may have parallel walls near the base or the shaft may have a rectangular cross section with two walls parallel and two walls tapering upwardly. Since a blast is not employed in the present invention, means for supplying a blast are not required. It is generally desirable to provide one or more doors 16 or other means of access to the charge in the shaft through which samples of the material may be taken to control the course of the process, to study the conditions and to determine the further additions which might be necessary. If desired, a plurality of doors may be provided at various levels. Heat is supplied to the charge by means of the electrodes 17 held in electrode holders 18 and extending into the deep slag bath 19 above the pool of molten metal 20 and connected to a source of current, for example of tri-phase alternating current. Three evenly spaced electrodes extending down into the slag bath 19 have been shown but other arrangements of the electrodes may be used. Thus, a bottom electrode extending up from the bottom into the pool of molten metal might be used although it is preferred to have the electrode extending down into the slag to avoid contact of the electrode with the molten metal. Likewise, other combinations of various numbers of electrodes might be used. The electrical energy dissipated in the slag bath 19 will heat the same to a readily controllable high temperature and this heat is transferred to the charge particles by radiation and in part through direct conduction. In case further additions of alloying ingredients, including carbon, or fluxes are necessary, this may be accomplished through funnel or hopper 21 which is connected to shaft 14 of the furnace by means of another screw conveyor 22 operated by any suitable actuating means, for example pulley 23. Tap holes 24 and 25 are provided in the furnace for withdrawing slag and metal, respectively, either continuously or intermittently. A gas outlet 26 connected to the uppermost portion of the shaft serves for withdrawing gases produced in the furnace. These gases may be utilized in various ways, for example, they may be introduced into chamber 1 through the injectors, or they may be burned in burners 10, used for chemical products, allowed to escape into the air, etc.

Fig. 3 is a top plan view of the apparatus showing the arrangement of the injectors, burners, electrodes, etc., in the apparatus. While four burners and four ejectors have been shown it will be apparent that other suitable numbers of burners, ejectors, waste gas outlets, air inlets, etc., may be used and may be arranged in any convenient manner.

From the foregoing discussion the operation of the apparatus embodying the invention will be readily understood by those skilled in the art. First of all, the ore and the necessary addition agents are fed to the top portion of chamber 1. Hereafter, rabble mechanism 4 is actuated and will cause portions of the charge to descend through tubes 7 along the side of chamber 1 to injectors 8. The air or gas injected through the injectors will cause an upward introduction of the finely comminuted charge material into the interior of chamber 1 and towards the central axis of the chamber at a substantial velocity causing "showering" and intimate intermixing of such charge and admixture of such charge with the gases contained in the chamber. This will cause partial reduction of the charge metal so that the energy required for a subsequent complete reduction will be greatly diminished and the gas production greatly decreased. Preferably, the paths of the ejected particles are so controlled that the majority of the particles are not projected a substantial distance above the middle of the chamber before said particles start to fall, as illustrated in Fig. 1 by the path of the particles issuing from the two ejectors shown in section. The material pretreated in the foregoing manner is now transferred by means of screw conveyor 12 into the shaft 14 of electric furnace 15 and will form a column therein resting quietly on and supported by slag bath 19. Further additions of alloys and fluxes may now be made through funnel 21 and screw conveyor 22. The reduction process started in chamber 1 is completed in the shaft or stack of the electric furnace as the charge passes down the shaft, usually at gradually increasing temperatures as it approaches the hot molten slag bath in which the heat is generated. The reduced particles of metal will pass into the hearth of the furnace through slag bath 19 which has a filtering and selective effect on the reduced material so that impurities, unreduced particles, etc., are retained while the refined metallic product will sink through the slag bath and may be tapped at metal tap hole 25.

In starting up the electric furnace, any suitable method may be employed. Thus, the electric furnace may be started by lowering the electrodes to the bottom of the furnace and there making contact with iron turnings or the like or with graphite in some form in order to form a path for the current. When this iron or steel becomes molten or the graphite becomes incandescent, the slag-making materials are put into the furnace and as these melt, the electrodes are gradually raised until the correct amount of slag pool has been formed, when the ore charge may be allowed to enter the furnace. The ore charge contains its own slag formers and as the slag is accumulated, any excess above the amount desired is allowed to flow from an overflow slag tap hole, usually continuously. The alloy additions are then made to bring up the metal to the desired carbon and alloy composition. These additions may be made by means of a screw conveyor at a point in the furnace just above the slag line. There is no means whereby these additions can become oxidized as there is no air in the furnace at that point. From time to time the metal may be tapped out into a ladle or into molds or any other vessel.

According to the present invention, the ore is mixed or in contact with a carbonaceous reducing agent, the calculated amount being just sufficient to reduce the charge and tending towards the insufficient side rather than an excess. The atmosphere throughout the process is substantially reducing and, preferably, air is excluded as much as possible.

It has been noted that the present invention is particularly suited for the treatment of finely divided, comminuted or pulverulent ores. Whereas prior processes have tended towards the largest available size of charge material, the present invention operates most effectively with finely divided ore material. Preferably, the ore will be no coarser than about 35 mesh. Pre-treatment of the finely divided ore in accordance with the present invention yields a very quiet charge in the shaft furnaces with very little production of gas thus permitting the smelting and refining of the finely divided or comminuted particles with little tendency to blow out. Prior methods involving the use of a blast or the production of large amounts of gas in the furnace have not been suitable for the smelting of finely divided ores often because of this tendency to blow out of the furnace. In the present invention this difficulty has been successfully overcome.

It will be appreciated that the pre-treatment of the finely divided ore in the auxiliary vessel, e. g., in a flash roaster, kiln, hearth, etc., is an important feature of the invention. The introduction of the charge containing ore, fluxes, reducing agents, etc., into the auxiliary vessel should be controlled so that intimate contact between the ore and reducing agent is obtained, e. g., by tumbling, showering, etc. As pointed out hereinbefore, the fine charge particles may be introduced under pressure through an injector and intimately mixed with the reducing agent, usually a carbonaceous reducing agent, which may be solid, liquid and/or gaseous, e. g., coke, oil, natural gas, furnace gases, etc. Preferably the charge is introduced into the auxiliary vessel in such a manner that the particles of the charge in the vessel are not closely packed, but, on the contrary, are loose and have motion imparted to them so that they rise and/or fall or otherwise circulate in a loose approximately stream-like or shower-like manner in said vessel. Injectors directed upwardly and more or less radially i. e., directed towards the central vertical axis of the chamber have been shown in the drawings to accomplish this object. One aim of this operation and arrangement is to keep the charge particles away from the walls of the auxiliary vessel as much as possible.

An important function of the treatment of the charge in the auxiliary vessel is to remove gases from the limestone, iron oxide, etc., in the charge. As a result of the pretreatment, the particles are preheated and are subjected to intimate and substantially individual contact with the reducing agent whereby reduction of the ore is also effected. I have found that in addition to removal of gases and partial reduction of the ore, substantial amounts of impurities may also be eliminated in the auxiliary vessel. The object of the pretreatment in the auxiliary vessel is not to yield a refined end product but to condition the charge material for treatment in the electric furnace. For example, no separation of unreduced or unreducible material from reduced material is made during the pretreatment in the auxiliary vessel.

If a rotary calciner, or the like is employed as the auxiliary vessel to treat the charge, the ore is mixed with the carefully determined or calculated amount of reducing agent, e. g., coal or coke, and with limestone and any other desirable fluxing or reducing agents, and fed into the rotary calciner or the like by any satisfactory means, for example a screw conveyor. The calciner or the like is preferably equipped with one or more burners at the discharge end so that the flow of ore, etc., against heating gases is countercurrent whereby the discharged material is at the highest feasible temperature.

According to the present invention, it is preferred to inject the dried, finely divided material into the auxiliary vessel at an upward angle and to collect the pre-treated material at the bottom of the vessel. This method produces advantages not obtained in other types of treatment. An advantage of this upward injection method is that the trajectory or the length of the path of travel of the particles may be regulated to suit the requirements and to produce properly treated and reduced material for introduction into the shaft furnace. By increasing or decreasing the amount of air used to inject the finely reduced material, for example by controlling the high pressure air valves, the trajectory or path of the particles through the heated atmosphere in the auxiliary chamber may be lengthened or shortened as required. This method has great advantage over a method comprising simply permitting the particles to fall through a chamber, a method which sometimes produces material not in the proper condition for further treatment in the shaft electric furnace. Where it is not required to remove sulfur from the charge material but it is merely desired to subject the material to a calcining treatment, i. e., to use the auxiliary vessel as a calciner, the injection method is preferred because of the control over the length of the path of the particles. Some of the waste gases of combustion may be bled into the auxiliary vessel to control the reaction to suit the desired conditions and/or to make certain reactions possible and/or to control the rate and thereby the temperature of the reaction.

The waste gases in the auxiliary vessel are removed through an outlet near the top of the vessel. A fan may be provided for this purpose as well as to permit the entrance of the correct quantity of secondary air, if needed, by the creation of sub-atmospheric pressures. The removal of waste gases has presented considerable difficulty when fine materials such as the fine ores contemplated in the present invention were to be treated. High losses of the fine material were often incurred through removal of the fine material along with the waste gases. In the preferred upward injection-type auxiliary vessel these difficulties are overcome. It has been found that the velocity of the gases and particles decrease as they approach the uppermost portion of the chamber and that the particles then settle and/or fall to the bottom, principally settling and/or falling down through a central zone of the chamber which appears to be comparatively free from rapidly rising gases which would tend to carry the particles upward.

In making up the charge and/or making additions during the process, sufficient fluxing agents should be incorporated to produce a high resistance and high boiling point slag, preferably highly basic but with sufficient fluidity. In actual practice I have found it rather important to maintain the slag in the slag resistance electric furnace comparatively low in iron oxide content, for example below about 10%. The presence of some iron oxide in the slag may be desirable as it appears to increase the dephosphorizing power of the slag. Preferably, the iron oxide content should not exceed about 6%, and satisfactory results are obtained with iron oxide contents not exceeding about 3%. The effect of iron oxide upon the slag is not completely understood but it would appear that it lowers the fusing and boiling point of the slag and may decrease the resistance of the slag. Regardless of the explanation, I have found that when the iron oxide content exceeds about 6% to 10% in a slag resistance furnace, the slag has the detrimental tendency to boil, sometimes to such an extent that slag is forced up into the stack or shaft and as a consequence interrupts the process and has other detrimental effects. It will be appreciated that it is very desirable that the operating conditions, charge composition, additions, etc., be controlled to maintain a low iron oxide slag in the furnace, preferably containing less than about 6% iron oxide, although some iron oxide in the slag may be desirable, for example to aid in removing phosphorus, silicon and other impurities which may be present in the metal as it settles through the slag. Decreases in slag resistance may be counteracted by the addition of lime, silica, etc.

It is desirable to have the solid charge enter the electric furnace at as elevated a temperature as possible and with as much gas removed from the limestone, iron oxide, etc., in the charge as is possible. This is accomplished by pre-treatment in at least one auxiliary vessel. The pre-treated charge entering the shaft or stack is preferably pre-heated to a temperature of at least about 1400° F. The discharged material from the auxiliary vessel is preferably transferred into the electric furnace shaft through a closed passage as rapidly as convenient. This not only prevents the pre-treated material from coming in contact with the air but also aids to conserve the heat in the pretreated material. The shaft or stack is comparatively short and should be designed to hold a charge which will not sink too deeply into the slag layer since a considerable portion of the weight of the charge is supported by the slag. On the other hand the shaft should be of sufficient height to hold a charge having enough weight to rest quietly on the slag. If the weight of the charge is too small, the charge has a tendency to "bounce." During its travel down the shaft the reduction of the metallic constituents in the charge continues and should be substantially complete by the time the charge particles reach the slag level.

Near the slag level, means are provided for additions, for example, fluxing additions, oxides and alloying ingredients, including carburizing ingredients, to control the slag composition, to control the reduction and to control or vary the end product as to oxygen, phosphorus, sulfur, carbon, alloy composition, etc. The aim of the process is to produce a metallic product which contains no carbon or very little excess carbon just above the slag level and to control the carbon content of the final product not necessarily by the carbon content of the charge but by the addition of carbon as recarburizers, etc., at the slag level or after the metal is tapped from the furnace, for example, in the ladle. Means are provided in the furnace for removal of slag and of metal. As will be apparent, semi-automatic or automatic control means may be used to compensate for variations in the slag level due to tapping operations, etc. A comparatively deep slag layer should be used to support the charge and to provide the desired electrical conditions for heating the furnace as well as to provide the desired filtering or cleansing means for removal of impurities, unreduced oxides, etc. Excellent results have been obtained with slag layers having a depth of at least about one foot in smaller furnaces and about three feet in the larger furnaces. The depth of the slag layer also depends upon the weight of the charge it is to support.

In order that those skilled in the art may have a better understanding of the invention, the following illustrative example may be given:

Example 1

A roasted concentrate having the following composition has been introduced into the apparatus of the invention:

| | Per cent |
|---|---|
| Iron | 65.34 |
| Sulfur | 1.20 |
| Oxygen | 27.60 |
| Insoluble | 3.84 |

By adjusting the conditions and making the necessary additions during a continuous run of operation a great variety of carbon contents could be obtained as desired in the finished product tapped from an electric slag resistance furnace as will appear from the illustrative examples given in the following table:

| Sample No. | Carbon |
|---|---|
| 1 | 0.76 |
| 2 | 0.54 |
| 3 | 1.18 |
| 4 | 1.12 |
| 5 | 3.35 |
| 6 | 0.36 |
| 7 | 0.23 |

The slag from these runs had an average analysis of:

| | Per cent |
|---|---|
| Silica ($SiO_2$) | 39.61 |
| Iron oxide (FeO) | 3.22 |
| Alumina ($Al_2O_3$) | 4.42 |
| Lime (CaO) | 42.62 |
| Magnesia (MgO) | 11.09 |
| Sulfur (S) | 0.24 |

The maximum content of iron oxide, calculated as FeO, in any of the slags was 6.4% indicating that where the analysis for oxygen, etc., in the charge and the calculation of carbon for reduction is carefully done there will not occur an undue loss of ore in the slag. The slag of the above analysis would not boil. This is in accordance with my observation that the maximum iron oxide content, calculated as FeO, in the slag has to be maintained substantially below about 10% in order to prevent detrimental boiling of the slag bath.

Example 2

An ore having the following analysis was treated in accordance with the present invention:

| | | |
|---|---|---|
| Iron | 62.64 | (89.5% $Fe_2O_3$) |
| Silica | 2.84 | |
| Alumina | 0.11 | |
| Lime | 0.19 | |
| Magnesia | Trace | |
| Sulfur | 1.10 | |
| Copper | 0.38 | |

The charge comprised about 100 parts of ore, about 22 parts of anthracite coal breeze carrying about 85% carbon, and about 5 parts of lime carrying about 2% of impurities. This charge was fed into a rotary kiln heated by the exhaust gases as well as by means of an auxiliary oil burner. The calciner charge was fed directly into the stack of an electric furnace of the slag resistance type. This high sulfur ore was treated with the particular view of demonstrating the controllability of carbon content but it also illustrates the effectiveness of the present invention to remove sulfur and produce a low sulfur steel. Such a high sulfur ore is not ordinarily met with in commercial practice. The resulting steel obtained from treating the foregoing ore in accordance with the present invention had the analysis given in the following schedule, prior to the customary ladle additions for deoxidation, etc., with the usual manganese, silicon and the like. The analysis prior to such ladle treatment is given to illustrate the composition of the resulting product produced in accordance with the present invention but in actual practice a deoxidation, etc., in the ladle or in any other customary manner would be desirable.

| | |
|---|---|
| Carbon | 0.28 |
| Sulfur | 0.048 |
| Phosphorus | 0.020 |
| Silicon | Trace |
| Manganese | None |
| Copper | 0.33 |
| Iron | Balance |

The control of carbon in a continuous smelting furnace has heretofore been practically impossible to accomplish on a commercially economic scale. In accordance with the present invention this difficulty has been overcome and a process and apparatus is provided whereby carbon, manganese, silicon, etc., in the final product may be controlled and carried out on a practical industrial scale.

It is to be observed that the present invention provides a process of reducing ore to metal, particularly iron ore to iron, which comprises pretreating comminuted charge material by subjecting the loose agitated ore particles of the charge to intimate contact with a reducing agent, preferably carbonaceous, at elevated temperatures but below the fusion temperature of the ore, subjecting a comminuted charge containing said pretreated solid particles of ore at elevated temperatures and in a quiet state to treatment in contact with a reducing agent and in the absence of a blast, continuing such treatment until reduced molten metal is obtained, subjecting said molten metal to the action of a molten slag to separate unreduced ore and other undesirable constituents from the molten metal, and collecting said molten metal whereby comminuted ore is reduced to metal without excessive loss of valuable constituents in the ore. The amount of reducing agent in the charge does not substantially exceed the calculated amount necessary to completely reduce the valuable metal constituents, including oxides, etc., to reduced metal and preferably is slightly insufficient to completely reduce such valuable constituents to reduced metal. It is preferred that a slag resistance electric furnace be used wherein the heat is generated by the passage of current through a deep molten slag bath. The pretreatment of the ore preferably comprises upwardly injecting ore particles into an auxiliary vessel and substantially towards the central vertical axis of said vessel and in intimate contact with a reducing agent, preferably a carbonaceous reducing agent.

It is also to be observed that the present invention provides an apparatus for reducing comminuted ore to metal which comprises in combination an auxiliary enclosed vessel for heating solid particles of iron ore in the presence of a reducing agent, a shaft furnace connectible thereto for receiving heated solid particles and adapted to hold a molten slag bath through which reduced metal passes and to collect the molten metal after it passes through the molten slag bath. The auxiliary vessel is preferably provided with upwardly directed injectors for projecting ore particles and other charge particles into said auxiliary vessel, preferably towards the central vertical axis of said vessel. The shaft of the shaft furnace is provided with walls that are non-converging downwardly.

Although the present invention has been described in conjunction with preferred embodiments, it is to be understood that modifications and variations may be resorted to without departing from the spirit and scope of the invention, as those skilled in the art will readily understand. Such variations and modifications apparent to those skilled in the art are to be considered to be within the spirit and scope of the appended claims.

I claim:

1. The process of reducing ore to metal which comprises pretreating a charge containing ore with a reducing agent in an amount insufficient to completely reduce the ore by subjecting said ore by agitation to intimate contact with said reducing agent at an elevated temperature below the fusion temperature of said ore to incompletely reduce the solid ore; subjecting a charge containing thus pretreated solid ore at elevated temperatures and in a quiet state substantially in the absence of gaseous or air blast to treatment in contact with a reducing agent in an amount insufficient to completely reduce said ore and continuing such treatment at elevated temperatures until reduced molten metal is obtained; subjecting said molten metal to the action of a deep bath of molten slag under the influence of heat generated by the passage of an electric current therethrough to separate unreduced ore from the molten metal, and collecting said molten metal whereby ore is reduced to metal without excessive loss.

2. The process of reducing iron ore to iron which comprises pretreating a comminuted charge containing iron ore and fluxing material with a reducing agent in an amount insufficient to completely reduce said ore by subjecting loose, agitated particles of iron ore and fluxing material to intimate contact with a reducing agent at an elevated temperature below the fushion temperature of said iron ore to obtain incomplete reduction of the iron oxide in said ore; subjecting the pretreated comminuted charge of solid particles at elevated temperatures in a quiet state and in the absence of an air blast to treatment in contact with a reducing agent in an amount insufficient to completely reduce said ore and continuing such treatment until reduced molten iron is obtained; subjecting said molten iron to the action of a deep bath of molten basic slag under the influence of heat generated by the passage of an electric current therethrough to separate non-metallic constituents, including unreduced iron ore, from the molten iron; maintaining the iron oxide content of said molten slag below about 10%; and collecting said molten iron whereby comminuted iron ore is reduced to iron.

3. The process of reducing iron ore to iron which comprises pretreating a comminuted charge containing iron ore, fluxing material and a carbonaceous reducing agent in an amount insufficient to completely reduce said ore by subjecting loose, agitated particles of said charge to an elevated temperature below the fusion temperature of said iron ore to remove gases and to partially reduce the iron oxide in the solid charge; subjecting the pretreated comminuted charge of solid particles in a quiet state and in the absence of an air blast to treatment at increasing elevated temperatures and continuing such treatment until reduced molten iron is obtained; subjecting said molten iron to the action of a deep bath of molten basic slag under the influence of heat generated by the passage of an electric current therethrough to separate unreduced non-metallic constituents, including iron ore, from the molten iron; maintaining the iron oxide content of said molten slag below 10%; and collecting said molten iron whereby comminuted iron ore is reduced to metal.

4. The process of reducing iron ore directly to steel which comprises pretreating a comminuted charge containing iron ore, fluxing material and a carbonaceous reducing agent in an amount insufficient to completely reduce the ore by subjecting loose, agitated particles of said charge to an elevated temperature below the fusion temperature of said iron ore whereby gases are removed from the charge and iron oxide in the solid charge is partially reduced; subjecting the pretreated comminuted charge of solid particles in a quiet state and in the absence of an air blast to treatment at elevated temperatures and continuing such treatment until reduced molten metal containing iron is obtained; adding alloying ingredients to said molten metal to adjust the composition thereof to steel having the approximate desired carbon content; subjecting the molten steel to the action of a deep bath of molten basic slag under the influence of heat generated by the passage of an electric current therethrough to separate unreduced iron ore from the molten steel; maintaining the iron oxide content of said molten slag below about 6%; and collecting said molten steel whereby iron ore is reduced directly to steel having the approximate desired carbon content.

5. The process of reducing iron ore directly to steel which comprises pretreating a comminuted charge containing iron ore and fluxing material by upwardly injecting loose particles of said charge in intimate contact with a carbonaceous reducing agent into a reducing atmosphere at an elevated temperature below the fusion temperature of said iron ore; controlling the exposure of the injected particles to the reducing agent to partially reduce iron oxide in the solid charge and expel gases from the charge; collecting said pretreated comminuted charge containing partially reduced iron oxide; subjecting said pretreated comminuted charge of solid particles in a quiet state to treatment at elevated temperatures and continuing such treatment until reduced molten metal containing iron is obtained; controlling the treatment to prevent the absorption of carbon in amounts substantially exceeding the desired carbon content in the final product; subjecting said molten metal to the action of a relatively deep bath of a molten basic slag under the influence of heat generated by the passage of an electric current therethrough, said slag containing at least one agent capable of dephosphorizing, desulfurizing or deoxidizing said molten metal, whereby unreduced iron ore and impurities are separated from molten steel having the approximate desired carbon content; and collecting said molten steel whereby iron ore is reduced directly to steel having the approximate desired carbon content.

6. The process of reducing iron ore to molten iron which comprises pretreating a comminuted charge containing iron ore in an auxiliary vessel by subjecting loose, agitated particles of ore in said vessel to intimate contact with a reducing agent at an elevated temperature below the fusion temperature of said iron ore; controlling the exposure of said particles of ore to the reducing agent to partially reduce iron oxide in the solid charge; conducting the pretreated solid charge particles to the shaft of an electric slag resistance shaft furnace; accumulating in said shaft a charge of pretreated solid particles in a quiet state, said charge being supported by a relatively deep molten slag bath containing less than about 10% iron oxide; subjecting said charge containing iron ore particles in contact with a reducing agent and in the absence of an air blast to heat generated in the molten slag bath by the passage of current therethrough; continuing the treatment as the charge passes down the shaft until reduced molten metal is obtained containing iron and free from carbon in excess of steel contents; passing said molten metal through a relatively deep bath of molten basic slag whereby unreduced iron ore is separated from said molten metal containing iron; maintaining the iron oxide content of said molten slag below about 10%; and collecting said molten metal containing iron whereby iron ore is reduced directly to molten iron.

7. The process of reducing iron ore directly to steel which comprises pretreating a comminuted charge containing iron ore and fluxing material in an auxiliary vessel by upwardly injecting into said vessel and substantially towards the central vertical axis of said vessel loose particles of said charge in intimate contact with a carbonaceous reducing agent in amounts insufficient to completely reduce all the metal oxides in the ore; subjecting said loose particles of the charge to elevated temperatures below the fusion temperature of said iron ore; controlling the pretreatment in said vessel of the injected particles to partially reduce the metal oxides of the ore and expel gases from the charge; conducting the pretreated solid charge particles to the shaft of an electric slag resistance shaft furnace; accumulating in said shaft a charge of said pretreated solid particles quietly supported by a relatively deep molten slag bath containing less than about 10% iron oxide; subjecting said charge containing iron ore particles in contact with a carbonaceous reducing agent in amounts insufficient to completely reduce all the metal oxides in the ore to heat generated in the molten slag bath by the passage of current therethrough; continuing the treatment as the charge passes down the shaft until reduced molten metal containing iron is obtained; adding alloying ingredients to the charge in the shaft to adjust the composition thereof to yield steel having the approximate desired composition; passing said molten metal through a relatively deep bath of molten basic slag in the hearth of said furnace whereby unreduced iron ore is separated from molten steel;

and collecting said molten steel whereby iron ore is reduced directly to steel having the approximate desired composition.

8. The process of reducing iron ore directly to steel which comprises pretreating a comminuted charge containing iron ore and fluxing material in an auxiliary vessel by continuously and upwardly injecting into said vessel and substantially towards the central vertical axis of said vessel loose particles of said charge in intimate contact with a carbonaceous reducing agent in amounts insufficient to completely reduce all the metal oxides in the ore; continuously subjecting said loose particles of the charge to elevated temperatures below the fusion temperature of said iron ore; controlling the pretreatment in said vessel of the injected particles to partially reduce the metal oxides of the ore and expel gases from the charge; conducting the pretreated solid charge particles to the shaft of an electric slag resistance shaft furnace; continuously accumulating in said shaft a charge of said pretreated solid particles quietly supported by a relatively deep molten slag bath containing less than about 6% iron oxide; continuously subjecting said charge containing iron ore particles in contact with a carbonaceous reducing agent in amounts insufficient to completely reduce all the metal oxides in the ore to heat generated in the molten slag bath by the passage of current therethrough; continuing the treatment as the charge passes down the shaft until reduced molten metal containing iron is obtained; adding alloying ingredients to said molten metal to adjust the composition thereof to steel having the approximate desired carbon and other alloy content; continuously passing the molten metal through a relatively deep bath of molten basic slag in the hearth of said furnace whereby unreduced iron ore is separated from molten steel having the approximate desired carbon content; and collecting said molten steel whereby iron ore is reduced directly to steel having the approximate desired carbon and other alloy content.

9. Apparatus for the reduction of comminuted ore to metal comprising in combination an auxiliary enclosed vertically positioned vessel so constructed as to permit the free rise and fall of particles projected upwardly into said vessel and away from the wall of said vessel and provided with means for heating upwardly projected solid particles of ore and fluxing material in the presence of a reducing agent, a furnace having a shaft to which heated solid particles may be conducted from said auxiliary vessel, said auxiliary vessel being connectible with said shaft, an enclosed hearth connected to said shaft for receiving molten reduced metal from said shaft, said hearth being adapted to hold a relatively deep molten slag bath, a plurality of electrodes adapted to conduct electrical current to said molten slag bath for generating heat in said molten slag bath by the passage of current therethrough, and means for removing reduced molten metal and molten slag from said hearth.

10. Apparatus for the reduction of comminuted ore to metal comprising in combination an auxiliary enclosed vertically positioned vessel so constructed as to permit the free rise and fall of particles projected upwardly into said vessel and away from the wall of said vessel and provided with means for heating upwardly projected solid particles of ore in contact with a reducing agent, a slag resistance electric shaft furnace, the walls of the shaft being non-converging downwardly, and means for conducting solid particles from said auxiliary vessel to said shaft substantially in the absence of air.

11. Apparatus for the reduction of comminuted iron ore to iron and steel comprising in combination an auxiliary vertically positioned enclosed vessel adapted to permit the free rise and fall of particles projected upwardly into said vessel and provided with means for projecting upwardly comminuted particles of a charge containing iron ore into the enclosed space and away from the wall of said vessel and for heating particles in said vessel, a slag resistance electric shaft furnace, said furnace having a shaft with walls non-converging downwardly, and means for conducting solid particles from said auxiliary vessel to said shaft substantially in the absence of air.

12. Apparatus for the reduction of comminuted iron ore to iron and steel comprising in combination an auxiliary vertically positioned enclosed vessel adapted to permit the free rise and fall of particles projected upwardly into said vessel and provided with means for projecting comminuted particles of a charge containing iron ore upwardly into the enclosed space and away from the wall of said vessel and substantially towards the central axis of said vessel and with means for heating particles in said vessel to eliminate gases from the charge, a slag resistance electric shaft furnace, said furnace having a short shaft with walls non-converging downwardly, and means for conducting solid particles from said auxiliary vessel to said shaft, said apparatus being substantially air-tight.

13. Apparatus for the reduction of comminuted ore to metal comprising in combination an auxiliary vertically positioned enclosed vessel, said auxiliary vessel being provided with means for projecting upwardly comminuted particles into the enclosed space and away from the wall of said vessel, means for heating particles in said vessel, and means for withdrawing gases from said vessel; a furnace having a shaft to which heated solid particles from said auxiliary vessel may be conducted, said auxiliary vessel being connectible with said shaft, said furnace being provided with an enclosed hearth below said shaft and connected thereto for receiving molten reduced metal from said shaft, said hearth being adapted to hold a relatively deep molten slag bath and being provided with electrical means for heating said slag bath and with means for removing reduced molten metal and slag from said hearth.

14. Apparatus for the reduction of comminuted iron ore to metal comprising in combination an auxiliary enclosed vessel, said vessel being provided with a plurality of injectors directed upwardly and away from the wall of said vessel and spaced about the lower portion of said vessel for projecting upwardly comminuted particles of a charge containing iron ore into the atmosphere and away from the wall of said vessel, means for conducting comminuted charge particles to said injectors, means for controlling the velocity of particles projected from said injectors into said auxiliary vessel, means for heating the particles projected into said vessel, and means for withdrawing gases from said vessel; an electric slag resistance shaft furnace provided with means near the base of the shaft for introducing ingredients into said shaft; and means for conducting particles from said auxiliary vessel to the shaft of said shaft furnace.

15. Apparatus for the reduction of comminuted iron ore to its metallic constituents comprising in combination an auxiliary enclosed vessel provided with a plurality of injectors directed upwardly and away from the wall of said vessel and located in the lower portion of said vessel for projecting upwardly comminuted particles of a charge containing iron ore into the atmosphere and away from the wall of said vessel, means for conducting comminuted charge particles to said injectors, means for heating the interior of said auxiliary vessel, and means for withdrawing gases from said vessel; a shaft furnace provided with means for removing gases from the shaft, an enclosed hearth below said shaft and connected thereto for receiving molten reduced metal from said shaft, said hearth being adapted to hold a relatively deep molten slag bath, means located above the slag line of said shaft furnace for introducing ingredients into said shaft furnace, a plurality of electrodes adapted to conduct electric current to said molten slag bath for generating heat in said molten slag bath by the passage of electric current therethrough, and means for removing molten metal and molten slag from said hearth; and means for conducting solid heated particles from the lower portion of said auxiliary vessel to the upper portion of the shaft of said shaft furnace.

16. Apparatus for the reduction of comminuted iron ore to steel and low carbon iron comprising in combination an auxiliary enclosed vessel provided with a plurality of injectors directed upwardly and away from the wall of said vessel and spaced about the lower part of said vessel for upwardly projecting comminuted particles of a charge containing iron ore into the atmosphere of said vessel and towards the central axis and away from the wall of said vessel, means for conducting comminuted charge particles and air under pressure to said injectors, means for controlling the pressure of the air to said injectors, means for heating the interior of said auxiliary vessel, means for withdrawing gases from and for admitting air to said vessel, and means located in the lower part of said vessel for collecting particles injected into the atmosphere of said vessel, a shaft furnace having walls, said walls of the shaft being non-converging downwardly, means for conducting solid heated particles from the collecting means of said auxiliary vessel to the upper part of the shaft of said shaft furnace substantially in the absence of air, said shaft furnace being provided with means for removing gases from said shaft, said furnace being provided with an enclosed hearth at the base of said shaft and connected thereto for receiving molten reduced metal from said shaft, said hearth being adapted to hold a relatively deep molten slag bath, said furnace being provided with means located above the slag line for introducing alloying ingredients, fluxing materials, oxides and the like into said shaft furnace, said furnace having a plurality of electrodes adapted to make electrical contact with said molten slag bath for generating heat in said molten slag bath by the passage of electric current therethrough, and said furnace being provided with means for removing molten metal and molten slag from said hearth.

17. The process of reducing ore directly to metal which comprises pretreating a comminuted charge containing ore and fluxing material by upwardly injecting loose particles of said charge in intimate contact with a reducing agent into a reducing atmosphere at an elevated temperature below the fusion temperature of said ore; controlling the exposure of the injected particles to the reducing agent to partially reduce ore in the solid charge and expel gases from the charge; collecting said pretreated comminuted charge containing partially reduced ore; subjecting said pretreated comminuted charge of solid particles in a quiet state to treatment at elevated temperatures and continuing such treatment until reduced molten metal is obtained; subjecting said molten metal to the action of a relatively deep bath of a molten slag under the influence of heat generated by the passage of an electric current therethrough, whereby unreduced ore is separated from the molten metal; and collecting said molten metal whereby ore is reduced directly to metal without excessive loss.

RAYMOND S. WILE.